June 6, 1967   E. B. SLEETER   3,324,319
ELECTRIC MOTOR FOR PEDESTAL TYPE SUMP PUMPS
Filed Jan. 7, 1964   2 Sheets-Sheet 1

Inventor
Edward B. Sleeter

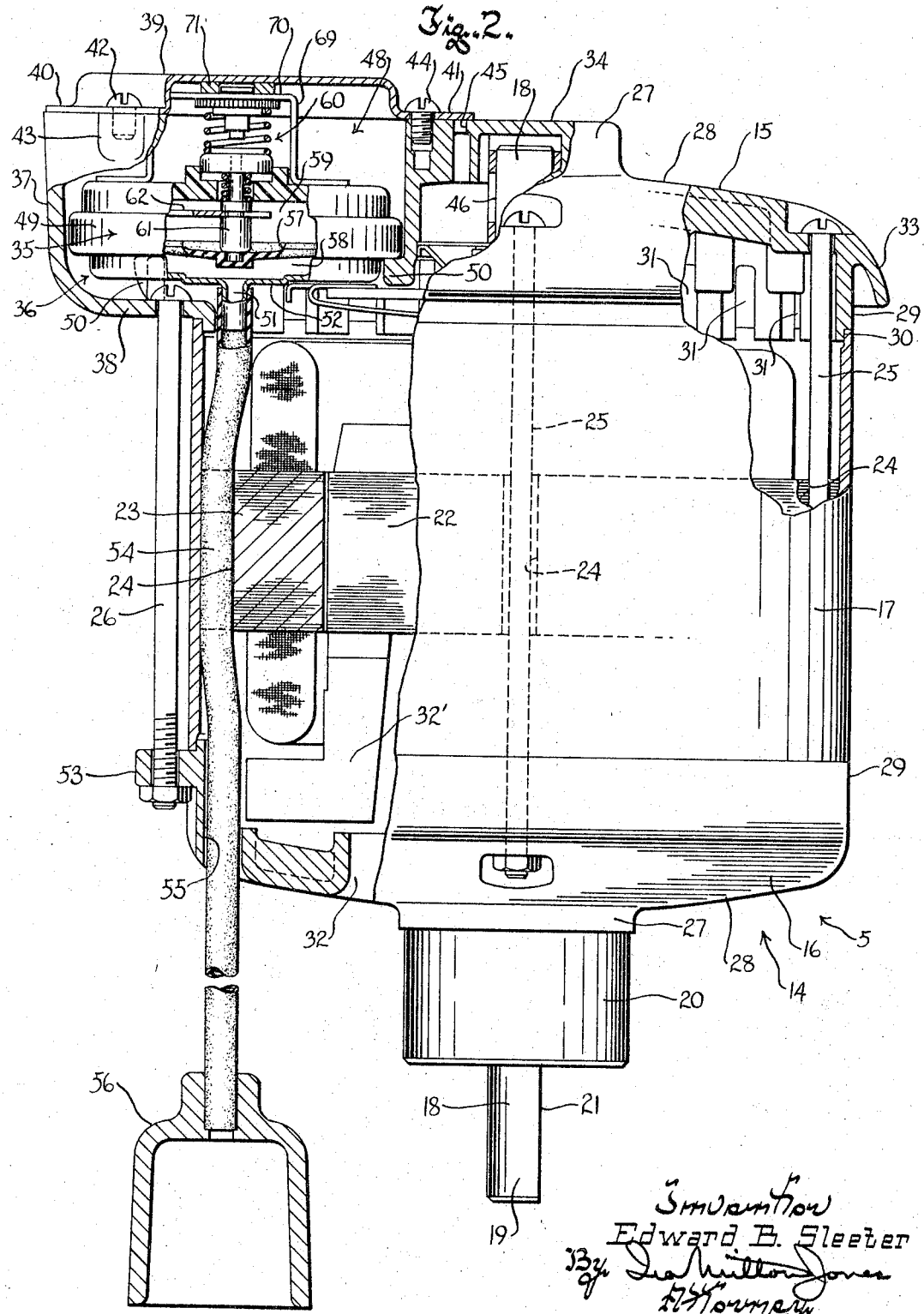

United States Patent Office 3,324,319
Patented June 6, 1967

3,324,319
ELECTRIC MOTOR FOR PEDESTAL TYPE SUMP PUMPS
Edward B. Sleeter, Wausau, Wis., assignor to Marathon Electric Manufacturing Corporation, Wausau, Wis., a corporation of Wisconsin
Filed Jan. 7, 1964, Ser. No. 336,258
7 Claims. (Cl. 310—68)

This invention relates to electric motor driven sump pumps, and has more particular reference to motors intended for use with so-called upright type sump pumps wherein a tubular pedestal projecting up from the pump supports the motor at a location a distance above the highest level of liquid in the sump, and the motor drives the pump through a pump shaft located inside the pedestal.

In most cases, pedestal type sump pumps are controlled by electric snap switches of the float operated type. Snap switches, however, are somewhat delicate mechanisms that can be easily damaged, and the past practice of mounting them in external and overhung positions on the motors they control greatly increased the possibility of their becoming damaged not only during handling and shipping, but also after mounting of the motors in sump pump installations.

It is a purpose of this invention, therefore, to provide control means, for a sump pump motor of the character described, which comprises a pressure sensitive switch of the diaphragm type that is far more rugged than the present float actuated snap switches employed to control pedestal style sump pump motors.

It is a further purpose of this invention to provide an electric sump pump motor of the character described featuring a top end bell or bracket having a switch compartment formed integrally therewith, in which the pressure sensitive motor control switch is completely enclosed to be at all times exceptionally well protected against damage by blows incidental to shipping, handling and the like.

Still another purpose of this invention resides in the provision of an improved end bell or "drip proof" top bracket for an electric sump pump motor of the character described, featuring ventilating slots that are formed in a substantially cylindrical rim on the bracket, and a wall portion that extends outwardly beyond the rim in surrounding relation thereto, and cooperates with wall portions of the switch compartment to provide an overhanging eave that prevents dripping water from entering the motor through its ventilating slots.

A further purpose of the invention is to provide a top bracket for a sump pump motor of the character described, featuring a cover for the top of the switch compartment and means securing the cover to the bracket in a manner enabling the cover to be pivoted to an open position providing access to the switch compartment as well as to an oil hole in the top of the bracket, normally closed by the cover, to facilitate the application of oil to a bearing in the bracket in which an end of the motor shaft is journalled.

With these and other objects in view which will appear as the description proceeds, this invention resides in the novel construction, combination and arrangement of parts substantially as hereinafter described and more particularly defined by the appended claims, it being understood that such changes in the precise embodiment of the herein-disclosed invention may be made as come within the scope of the claims.

The accompanying drawings illustrate one complete example of the physical embodiment of the invention constructed according to the best mode so far devised for the practical application of the principles thereof, and in which:

FIGURE 2 is an enlarged view of the motor of this invention, with parts of its housing broken away to show internal construction.

Figure 1:
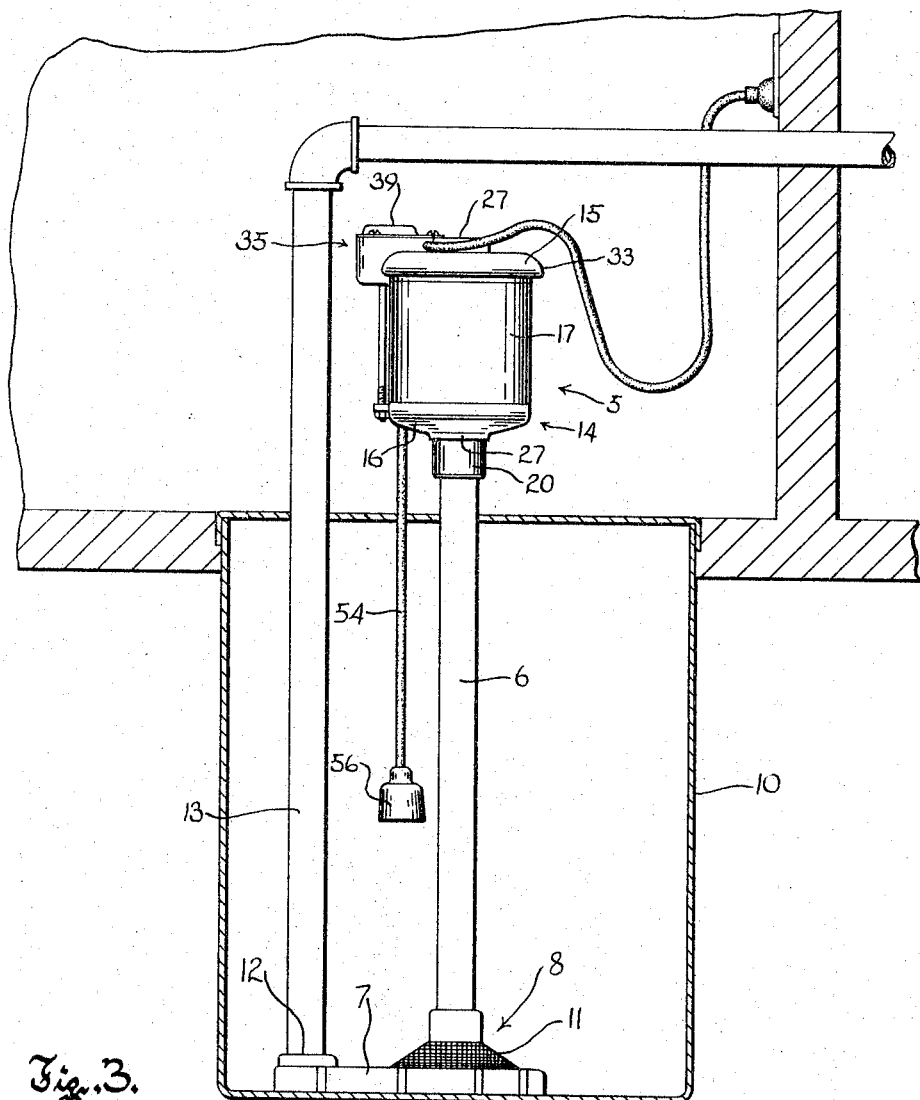
FIGURE 1 is a view partly in section and partly in elevation, showing a sump pump installation of the upright or pedestal type and incorporating the electric motor of this invention.

Referring now more particularly to the accompanying drawings, in which like reference characters have been applied to like parts, the numeral 5 generally designates the electric sump pump motor of this invention. Since the motor is intended for sump pump installations of the type commonly referred to as upright or pedestal style, it has here been shown mounted on the upper end of an elongated upright tubular pedestal 6. The lower end of the pedestal is secured in the housing 7 of a centrifugal type pump, generally designated 8, and as customary, the pump housing provides a supporting base that seats flatwise upon the bottom wall 9 of a sump 10. The pedestal 6 has sufficient height to support the motor at an elevation above the top of the sump, and contains a pump drive shaft (not shown) to drivingly connect the motor with the pump rotor.

The pump has a screened inlet 11 coaxial with the pedestal 6, and its outlet 12 is spaced a distance to one side of the pedestal and has a discharge pipe 13 connected therein to conduct liquid issuing from the pump upwardly and out of the sump to a drain, not shown.

The motor comprises a housing 14 defined by top and bottom end bells or brackets 15 and 16, respectively, and a cylindrical side wall or stator frame 17 confined axially between the end bells. Four tie bolts, which will be later referred to, hold the brackets securely in place on the axial ends of the stator frame.

The motor shaft 18 has end portions which are journalled in suitable bearings carried by the end bells or brackets 15 and 16, and only one end portion 19 of the motor shaft projects from the housing for connection with the pump drive shaft.

The electric motor is supported on the upper end of the pedestal 6 with its shaft 18 vertical and coaxial with the pedestal. For this purpose, the bottom end bell or bracket 16 is formed with an adaptor 20, in this case shown as a socket in which the upper end of the pedestal 6 is secured in any desirable manner. As seen in FIGURE 2, the lower end portion 19 of the motor shaft projects downwardly beyond the socket 20, and may have a flat side 21 formed thereon to facilitate coupling of the shaft to the pump drive shaft within the pedestal.

The rotor 22 of the motor is fixed to the shaft 18 in the usual manner to rotate within an annular stator 23. As is customary, the stator is mounted in and snugly encircled by the cylindrical side wall 17 that provides the stator frame, and it has four circumferentially equispaced notches 24 in its periphery. Three of the tie bolts 25 pass through these notches in the stator so as to be surrounded by the stator frame 17, in more or less conventional fashion. The fourth tie bolt 26 does not extend downwardly through the stator frame, as do the remaining tie bolts, but is located externally of the motor housing, as will be explained hereinafter.

The end bells or brackets 15 and 16 are castings having the usual dish shaped configuration, and both have central bearing hubs 27 that project outwardly from their convex walls 28, and in which end portions of the motor shaft are journalled. Since it is important that the shaft be rotatably journalled exactly coaxial with the annular stator 23, the end bells or brackets have what might be termed a more or less interlocking connection with the axial ends of the housing side wall or stator frame 17. This interlocking connection can be of the usual type wherein a substantially cylindrical rim portion 29 on each of the brackets has an outwardly opening circumferential notch or rabbet 30 machined in its extremity to receive the adjacent end portion of the stator frame and thus accurately locate the end bells or brackets with respect to the frame.

The rim 29 of the top end bell or bracket has a number of equispaced ventilating slots 31 formed therein, which open to the extremity of the rim and extend upwardly a substantial distance from the adjacent end of the stator frame. Air for cooling the internal parts of the motor is drawn inwardly into the motor housing through vents 32 in the bottom end bell, by an impeller 32' fixed with respect to the rotor near the bottom end bell 16, and such air is discharged upwardly through the slots 31.

The wall 28 of the top end bell or bracket 15 is extended outwardly and downwardly as at 33, from its junction with the cylindrical rim 29 of the bracket, to provide an overhanging eave which is spaced outwardly from and substantially surrounds the ventilating slots 31. This eave serves to prevent water dripping down upon the top of the motor from entering the interior of the motor through the ventilating slots 31. In this connection, since cooling air circulated through the motor housing discharges through the slots 31 in the upper end bell, it might be said that the eave 33 cooperates with the impeller 32' to preclude entrance of water into the slots 31. Inasmuch as the hub 27 on the top bracket 15 has an end wall 34 that covers the upper end of the motor shaft 18, it will be apparent that the top end bell or bracket is constructed to render the motor drip-proof.

As is customary, the operation of the motor is controlled by an electric switch that is actuated in accordance with the level of water within the sump. While float actuated snap switches were ordinarily used for this purpose in the past, the motor of this invention features a pressure sensitive switch instrumentality 35 that is for far more rugged than the somewhat delicate and easily damaged float actuated snap switches used heretofore. Although the pressure sensitive switch instrumentality 35 is able to withstand considerable abuse during handling, it is a further feature of this invention that the top end bell 15 is constructed to provide a protective enclosure or switch compartment 36 for the switch instrumentality 35, so as to afford postive assurance against damage to the switch mechanism during handling and/or shipping of the motor, as well as during use of the motor in a sump pump installation.

The switch compartment 36 is defined by a hollow boss on one side of the upper end bell 15, partly overhanging the stator frame. It has an upstanding side wall portion 37 that is substantially semi-cylindrical when viewed in plan, and which merges with the adjacent portions of the wall 28 of the top end bell. A more or less horizontal wall 38 closes the overhanging bottom portion of the boss, and is formed as an outwardly extending lip on the rim 29 of the bracket.

The compartment 36 defined by the walls of the boss is in open communication at its bottom with the interior of the top bracket 15, and hence with the space inside the upper end portion of the stator frame 17. This compartment has a mouth which opens upwardly and defines an upwardly facing horizontal surface that is coplanar with the wall 34 on the end of the adjacent bearing boss 27. In use, the open top of the switch compartment is closed by a cover 39 having a peripheral flange 40 which seats upon the upper edge of the compartment side wall. This flange also has a tab 41 which extends radially inwardly over the top 34 of the bearing boss.

The cover is secured in place closing the top of the switch compartment by means of three circumferentially equispaced screws. Two of these screws 42 pass through holes in the flange of the cover and thread into bosses 43 on the exterior of the switch compartment, while the third screw 44 passes through the inner end of the cover tab 41 and threads into the adjacent end of the bearing boss.

The tab 41 normally covers the upper end of a hole 45 drilled downwardly through the bearing hub, and which provides an oil hole through which lubricant can be supplied to the bearing 46 in which the upper end portion of the motor shaft 18 is journalled. It is a feature of this invention that when the two screws 42 are removed, and the third screw 44 loosened, the cover 39 can be swung edgewise about the axis of the inner screw 44 to not only provide access to the interior of the switch compartment 36 but to also uncover the oil hole 45 so that lubricant can be supplied to the bearing in the bracket 15.

As stated, the pressure switch instrumentality 35 is housed within the switch compartment 36, and while the switch instrumentality itself is of more or less conventional construction, its mounting and confinement within the compartment requires the top end bell or bracket to have certain features of construction that will be described shortly. The switch instrumentality, of course, comprises the usual casing 48 of generally cylindrical form, but having a central enlargement 49 by which the casing is supported upon ledge means formed on the compartment walls at its interior. The ledge means comprise three circumferentially equispaced pads 50, an inner one of which is defined by an outwardly directed lip on the inner end of the adjacent bearing boss. The other two pads are formed on the side wall 37 of the switch compartment. These pads define upwardly facing supporting surfaces that are spaced a short distance above the bottom 38 of the switch compartment. The enlarged medial portion of the switch casing seats upon the pads 50, which hold the casing with its axis vertical, and with a pressure port 51 in its bottom wall 52 preferably in line with the unoccupied stator notch 24 beneath it.

As brought out hereinbefore, the stator notch which aligns with the pressure port 51 would ordinarily receive one of the tie bolts 25, namely that bolt 26 which in this case is disposed externally of the housing side wall 17. In the present case, however, the bolt 26 passes through an aperture in the bottom wall 38 of the switch compartment and has its threaded lower end received in a lug 53 projecting laterally from the bottom end bell or bracket 16.

The unoccupied adjacent stator notch 24 can thus accommodate a flexible tube 54 which has its upper end connected with the pressure port 51 in the bottom of the switch casing, and which extends downwardly through the interior of the motor directly alongside the inner surface of the stator frame 17. The tube 54 passes downwardly through a suitable hole 55 in the bottom end bell or bracket 16, and extends a substantial distance below the bracket where it has an inverted cup member 56 attached to it, in communication with its interior.

The cup member 56, of course, is adapted to be immersed in liquid in the sump, and has a diving bell effect upon air trapped inside the cup member so as to impose pressure upon the switch instrumentality 35 which is proportional to the head of liquid above the cup member, and to which the switch mechanism can respond in order to start the electric motor when the liquid rises to a predetermined high level within the sump, and to stop the motor when the liquid in the sump drops to a predetermined low level which always be somewhere above the bottom of the cup member.

Attention is directed to the fact that no special construction is necessary to accommodate the tube 54, since it occupies one of the stator notches ordinarily provided for the tie bolts of the motor housing. Moreover, the described mounting of the tube provides a desirable degree of protection for the tube and especially its connection to the switch instrumentality.

At a short distance above its bottom wall 52, the switch casing has a flexible diaphragm 57 extending entirely thereacross to define a pressure chamber 58 beneath it, and a switch chamber 59 above it. The pressure chamber, of course, is communicated by the tube only with the space inside the inverted cup member 56 at the bottom of the tube, while the switch chamber is vented by the usual vent holes to the interior of the switch compartment, and hence to the interior of the motor housing.

The diaphragm is normally held in a downwardly flexed condition by spring means generally designated 60, acting upon the diaphragm through a switch actuating button 61 that has a motion transmitting connection at its lower end with the diaphragm. In the normal position of the mechanism shown, the actuating button 61 holds the switch mechanism in circuit open position through its connection with the blade 62 of the switch. However, when the pressure in the inverted cup member and hence in the pressure chamber rises to a predetermined value corresponding to maximum height of liquid in the sump, the resulting upward flexure of the diaphragm effects closure of the switch and energization of the motor to start a pumping cycle.

The motor will remain in operation until the level of liquid in the sump drops to a predetermined low level, for example, at which the cup member 56 is just immersed in the liquid. At that time, the pressure in the pressure chamber 58 will have dropped, in consequence of the diminished head of liquid, to a value such that the spring means 60 effects opening of the switch.

Figure 3:
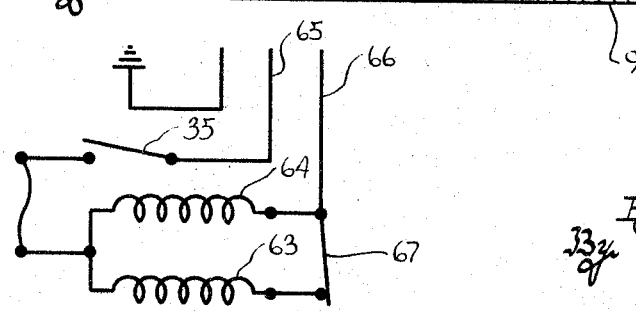
FIGURE 3 is an electrical diagram illustrating the electrical connections of the motor and the switch instrumentalities that control its operation.

The electrical connections for the motor can be seen in the FIGURE 3 diagram where it will be noted that the motor has starting and running windings 63 and 64, respectively, connected together at one end and to a first supply lead 65 through the pressure responsive switch instrumentality 35, and a second supply lead 66 that is at all times connected to the other end of the running winding 64 but is connectable with the other end of the starting winding through a conventional normally closed centrifugal switch 67. After the motor attains running speeds, of course, the centrifugal switch 67 opens to deenergize the starting winding.

That part of the spring mechanism 60 which extends above the top of the switch casing is held in place by a spring anchor in the form of an inverted U-shaped strap 69 having its legs secured to the top of the casing. The bight portion 70 of the strap receives the reaction force of the spring and extends horizontally over the top of the switch casing, just under the cover 39 for the switch compartment. In the present case, the cover is utilized to hold the switch instrumentality 35 in place in the switch compartment, firmly seated on the pads or ledges 50, and for this purpose spacer pads 71 are confined between the underside of the cover and the bight portion 70 of the spring anchor.

With the pressure switch instrumentality 35 mounted in the manner described, it is exceptionally well protected against damage either during handling of the motor or after the motor has been incorporated in a sump pump installation as seen in FIGURE 1.

From the foregoing description taken together with the accompanying drawings it will be readily apparent to those skilled in the art that this invention provides an improved sump pump motor featuring a top end bell or bracket that is constructed to completely house and protect the liquid level responsive switch instrumentality by which operation of the motor is governed, as well as to render the motor drip-proof.

What is claimed as my invention is:

1. In an electric sump pump motor of the type having a housing comprising top and bottom brackets with bearings in which the motor shaft is journalled, a substantially cylindrical stator frame confined axially between the brackets, and an adaptor on the bottom bracket for mounting the motor on the upper end of a tubular pedestal with the motor shaft in driving relation to a pump shaft inside the pedestal:

(A) means on the top bracket defining a switch compartment which extends from one side of the housing, and a bottom portion of which compartment opens downwardly to the space inside the adjacent end portion of the stator frame;

(B) a pressure sensitive switch unit mounted in said compartment, for governing operation of the motor, said unit having a pressure port which opens downwardly toward the bottom of the compartment at a location inwardly adjacent to the stator frame;

(C) the bottom bracket having a hole therethrough at a location near to but inwardly of the stator frame and beneath said pressure port;

(D) an elongated tube extending upwardly through said hole and along the inner surface of the stator frame, said tube having its upper end connected with the pressure port of the pressure sensitive switch unit;

(E) and an inverted cup member on the lower end of the tube having its interior communicated with the pressure switch unit through said tube, so as to effect actuation of the switch unit in accordance with changes in the pressure of air trapped in the cup member when the latter is immersed in liquid contained in a sump.

2. In an electric sump pump motor of the type having a housing comprising top and bottom brackets with bearings in which the motor shaft is journalled, a substantially cylindrical stator frame confined axially between the brackets, and an adaptor on the bottom bracket to provide for mounting the motor on the upper end of a tubular pedestal with the motor shaft in driving relation to a pump shaft inside the pedestal:

(A) wall means integral with the top bracket defining a switch compartment which extends from one side of the housing and a bottom portion of which compartment opens downwardly to the space inside the adjacent end portion of the stator frame;

(B) a pressure sensitive switch unit mounted in said compartment, for governing energization and deenergization of the motor, said switch unit having
 (1) a casing with a pressure port which opens downwardly toward the bottom of the compartment at a location inwardly adjacent to the stator frame,
 (2) a switch actuator,
 (3) and a flexible diaphragm which extends across the interior of the casing and defines a pressure chamber in the bottom portion of the casing, said diaphragm being yieldingly biased toward the pressure port and being connected with the switch actuator to effect switch closure as a result of flexure of the diaphragm away from the pressure port in consequence of a rise in the pressure of air in the chamber to a predetermined value, and to effect opening of the switch as a result of the bias produced downward flexure of the diaphragm that occurs when the pressure of air in the chamber drops substantially below said predetermined value;

(C) the bottom bracket having a hole therethrough at a location near to but inwardly of the stator frame and in line with said pressure port;

(D) an elongated tube having its upper end connected with said pressure port, said tube extending downwardly through the motor housing along the inner surface of the stator frame, passing through the hole in the bottom bracket to the exterior of the motor, and having its lower end disposed a substantial distance below the bottom bracket;

(E) and an inverted cup member on the bottom of the tube having its interior communicated therewith, and adapted to have a diving bell effect upon air trapped in the cup member when immersed in liquid, to cause the pressure of air in said pressure chamber to increase in proportion to the head of liquid above the cup member.

3. In an electric sump pump motor of the type having a housing comprising top and bottom brackets with bearings in which the motor shaft is journalled, a stator frame having a substantially cylindrical wall confined axially between the brackets, and a downwardly extending adaptor on the bottom bracket to mount the motor on the upper end of a tubular pedestal with the motor shaft in driving relation to a pump shaft inside the pedestal:
  (A) wall structure integral with the top bracket, at one side thereof, defining a switch compartment which is open at its top and has a bottom portion in open communication with the space inside the adjacent end portion of the stator frame adjacent to the wall thereof;
  (B) a pressure sensitive switch unit having a casing with a pressure port therein;
  (C) means mounting the switch unit in said compartment for removal out of the top of the compartment and with its pressure port lowermost, comprising
    (1) ledge means on said wall structure, located near the bottom of the compartment and providing upwardly facing supporting surfaces upon which the switch casing rests,
    (2) a cover detachably secured to the top bracket and closing the open top of the switch compartment,
    (3) and means comprising an inverted U-shaped strap confined between the switch casing and the underside of the cover to hold the casing in place on the supporting surfaces provided by the ledge means;
  (D) and duct means connected with said pressure port for supplying switch controlling pressure to the switch unit.

4. An electric sump pump motor of the type adapted for mounting upon the upper end of a pedestal so as to be held above a sump in which the pump operates, and which is controlled by a pressure sensitive switch unit, in accordance with the level of liquid in the sump, in consequence of change in air pressure imposed upon the switch unit through a tube having its upper end connected therewith and having an inverted cup member on its lower end for immersion in the liquid in the sump, said motor being characterized by the following:
  (A) a housing having
    (1) a substantially cylindrical stator frame,
    (2) a stator fixed within and intimately surrounded by said frame, and having bolt receiving notches in its periphery parallel to the axis of the frame,
    (3) top and bottom brackets on the axial ends of the stator frame, the bottom bracket having a hole therethrough aligning with one of the stator notches,
    (4) a plurality of elongated bolts holding the brackets in place, one of said bolts being disposed externally of the stator frame and adjacent to said one stator notch, and the other bolts being disposed internally of the stator frame and passing through the remaining stator notches,
  (B) wall structure integral with the top bracket defining an upwardly opening and laterally projecting compartment in which the switch unit is housed, a bottom portion of said compartment opening to the space within the adjacent end portion of the stator frame at a location directly above said one stator notch;
  (C) a cover on the upper bracket closing the top of the switch compartment;
  (D) and said tube passing upwardly through the hole in the bottom bracket, said one notch in the stator, and the open bottom portion of the switch compartment for connection with the pressure switch unit.

5. The sump pump motor of claim 4, wherein: the switch compartment is located at one side of the top bracket and has a bottom wall portion that extends laterally beyond the stator frame; the bottom bracket has a lug thereon below said bottom wall portion of the switch compartment; and said external bolt is connected between said lug and bottom wall portion of the switch compartment.

6. A top bracket for a pedestal type sump pump motor, characterized by:
  (A) a centrally disposed bearing boss to fit over and rotatably journal the upper end of a motor shaft, said boss having
    (1) a substantially cylindrical side wall to encircle the adjacent end of a motor shaft therein,
    (2) a top wall to cover the end of a motor shaft in the boss and being integrally joined to the side wall,
    (3) and an oil admitting hole opening through said top wall, through which lubricant can be supplied to the end portion of a motor shaft journalled in the boss;
  (B) a substantially cylindrical rim portion with a circumferential notch to mount the end bell on the upper end of the stator frame of a motor;
  (C) integral wall structure defining an upwardly opening switch compartment laterally adjacent to the bearing boss, a bottom portion of said compartment being open to the space inside said rim, said compartment having side and bottom wall portions that extend laterally outwardly of the rim, and having its top substantially coplanar with said top wall of the bearing boss;
  (D) a cover closing the top of the switch compartment, and having a tab extending substantially radially inwardly from the cover and over said oil admitting hole to close the same;
  (E) and means securing the cover to the bracket comprising a screw in the bearing boss, passing through said tab adjacent to its junction with the cover and radially outwardly of the oil admitting hole, said screw, when loosened, providing a pivot about which the cover may be swung to carry the tab thereon away from the oil admitting hole and thereby provide access to said hole and to the interior of the switch compartment through the top thereof.

7. The bracket of claim 6, further characterized by:
  (A) ventilating slots in the rim portion extending a substantial distance upwardly from its circumferential notch;
  (B) and wall portions integral with said rim portion defining an eave outwardly of and encircling the rim portion, said eave terminating a distance below the upper ends of the ventilating slots and near the circumferential notch in the rim portion.

References Cited
UNITED STATES PATENTS

| | | | |
|---|---|---|---|
| 1,725,401 | 8/1929 | Layne | 310—66 |
| 2,592,070 | 4/1952 | Robinson | 310—89 |
| 2,661,146 | 12/1953 | Hill et al. | 310—66 |
| 2,743,385 | 4/1956 | Potter | 310—88 |
| 2,914,081 | 11/1959 | Bigham | 103—25 |
| 2,922,854 | 1/1960 | Nielsen | 103—25 X |
| 3,070,021 | 12/1962 | Tutthill | 103—25 |

MILTON O. HIRSHFIELD, *Primary Examiner.*

J. D. MILLER, *Assistant Examiner.*